Jan. 13, 1953 E. A. GLYNN 2,625,199
METHOD OF TOP-CAPPING HEAVY-DUTY TIRES
Filed Oct. 31, 1950 2 SHEETS—SHEET 1
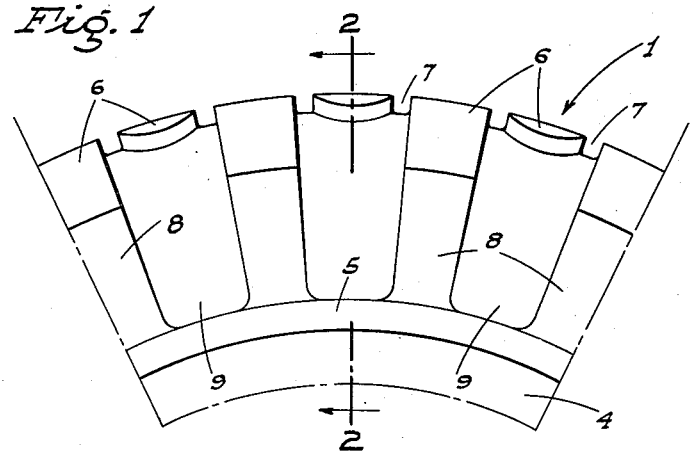
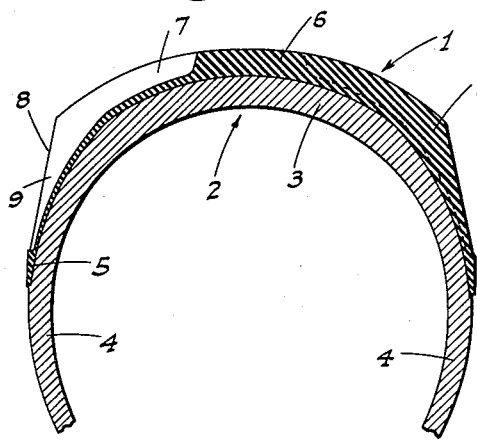
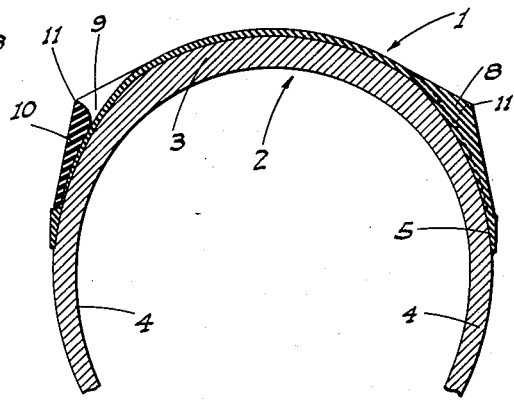
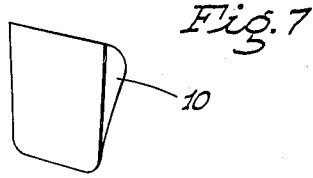
Inventor
Edwin A. Glynn
By
ATTORNEYS Jan. 13, 1953            E. A. GLYNN           2,625,199

METHOD OF TOP-CAPPING HEAVY-DUTY TIRES

Filed Oct. 31, 1950                  2 SHEETS—SHEET 2

Inventor
Edwin A. Glynn

ATTORNEYS

Patented Jan. 13, 1953

2,625,199

UNITED STATES PATENT OFFICE 2,625,199

METHOD OF TOP-CAPPING HEAVY-DUTY TIRES

Edwin A. Glynn, Lodi, Calif., assignor to Super Mold Corporation of California, Lodi, Calif., a corporation of California Application October 31, 1950, Serial No. 193,093

4 Claims. (Cl. 154—14)

This invention relates in general to the art of retreading worn tires; the instant improvement pertaining especially to a method of top-capping large, heavy-duty, industrial tires such as are used on earth working scrapers and the like.

Tires of this character are initially manufactured with traction cleats which extend across the tire in spaced relation circumferentially thereof so as to form traction grooves between such cleats. Such cleats usually lap each other on the crown of the tire in the direction of rotation, and extend alternately from said crown down opposite sidewalls of the tire. As a consequence, each sidewall is formed exteriorly, and generally radially thereof, with traction cleat portions, and traction grooves therebetween, both of which extend well down said sidewalls.

In vulcanizing a new top tread on such a tire—known in the trade as top-capping—it is not practical to provide a matrix, in the vulcanizing mold, which has tread design elements to fit into the traction grooves on the tire sidewalls. Heretofore, if it was attempted to top-cap the tire in a matrix which—without more—merely skirted the sidewalls, there was too great a loss of top tread rubber in such traction grooves on the tire sidewall.

It is therefore the major object of this invention to provide a method of top-capping heavy-duty industrial tires which permits the latter to be top-capped, to original tread width, in a matrix having tread forming elements only in the portion corresponding to the crown of the tire, and which matrix merely skirts the tire sidewalls; i. e. does not have elements matchingly engaging in the traction grooves on said sidewalls.

Another important object of this invention is to provide a method, as above, which includes the steps of inserting removable filler plugs in the traction grooves on the tire sidewalls prior to placement of the tire in the matrix; such filler plugs preventing flow of the top-capping material or camelback, when it is in its fluid state during the vulcanizing operation, into the space occupied by said filler plugs. Thereafter, when the top-capping operation is complete the filler plugs are stripped from the tire sidewalls.

A further object of the invention is to provide a method as above wherein such filler plugs are of pre-vulcanized or pre-cured rubber, and thus do not become adherent to the tire during the top-capping operation.

It is also an object of this invention to provide a method of top-capping tires which can be accomplished with ease and economy, with substantial saving in top-capping material or camelback, and by means of a matrix which is simple in the portion matching or skirting the tire sidewalls.

Still another object of the invention is to provide a practical and reliable method of top-capping heavy-duty tires, and yet one which will be exceedingly effective for the purpose for which it is designed.

These objects are accomplished by means of such structure and relative arrangement of parts as will fully appear by a perusal of the following specification and claims.

In the drawings:

Fig. 1 is a fragmentary side elevation of a large heavy-duty tire as originally formed.

Fig. 2 is a transverse section on line 2—2 of Fig. 1.

Fig. 3 is a similar view, but shows the tread of the tire as worn, buffed smooth preparatory to application of the top treading material or camelback, and with the filler plugs as inserted in the traction grooves on the sidewalls.

Fig. 7 is a perspective view of one of the filler plugs.

Figure 4:
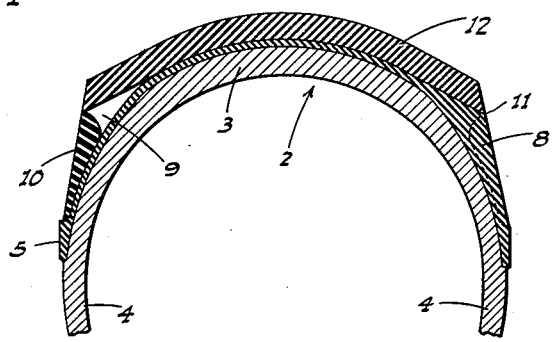
Fig. 4 is a view similar to Fig. 3, but shows the camelback in place on the tire.

Referring now more particularly to the characters of reference on the drawings, the tire, indicated generally at 1, includes a body or carcass 2 comprised of a crown 3 and sidewalls 4; there being circumferential side bands 5 about the sidewalls some distance radially inwardly of the crown 3.

As initially formed, the tire 1 includes, on the crown 3, a plurality of transversely extending traction cleats 6 spaced apart circumferentially of the tire, whereby to form traction grooves 7 on the crown.

Adjacent traction cleats 6 partially lap each other and extend alternately from the crown 3 down opposite sidewalls 4 of the tire whereby to form, on said sidewalls, and in alternate relation, downwardly tapering traction cleats 8, with traction grooves 9 therebetween.

After the original tire 1, as in Fig. 1, is worn on the tread, such tread, including the traction cleats 6 on the crown 3, but not the traction cleats 8 on the sidewalls 4, is buffed down or smoothed, as in Fig. 3. Thereafter, filler plugs 10, preferably of pre-vulcanized or pre-cured rubber, are inserted in the traction grooves 9 on the sidewalls 4, each such filler plug 10 substantially matchingly engaging in position and being removably cemented in place. In the present embodiment each filler plug 10 is substantially rectangular in face elevation and tapers from top to bottom.

When in place, the filler plugs 10 extend upwardly to substantially the circumferential shoulder line 11 which exists between the buffed-down top or crown of the tire and the still remaining or untouched cleat extensions 8 on the sidewalls of the tire.

After the filler plugs 10 are inserted, the next step is the application of the new tread material or camelback 12, which camelback is applied to the crown 3 of the tire in the usual manner, being cemented thereto and adhered by pressure.

When the camelback 12 is in place the prepared tire is inserted in the matrix 13 of the tire vulcanizing mold, which matrix includes skirts 14 which retain the sidewalls of the tire but which skirts do not include matrix or tread forming elements, thereby simplifying matrix construction and use.

After the tire is placed in the matrix 13 the tread vulcanizing or top-capping operation is carried out under conditions of heat as usual; the camelback 12 being vulcanized to the crown 3, the new traction cleats 15 and new traction grooves 16 being formed on the crown 3 by elements within the corresponding portion of the matrix.

Figure 5:
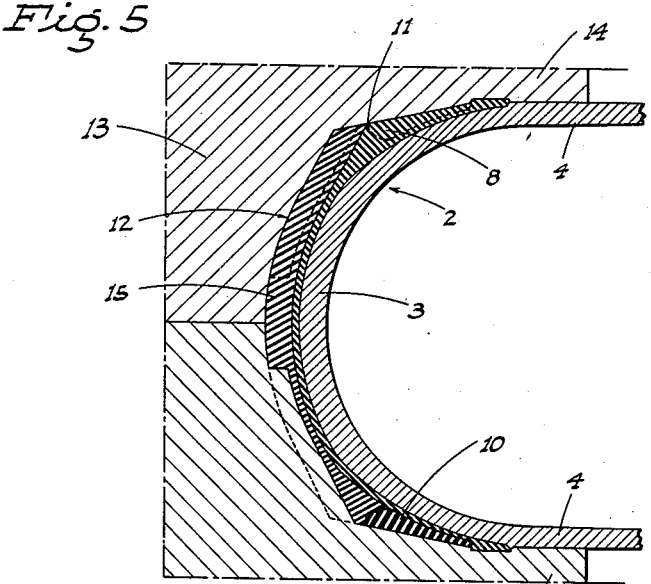
Fig. 5 is a fragmentary transverse section showing the prepared tire, as in Fig. 4, engaged in the matrix of a tire retreading mold.

However, as the original side traction grooves 9 for the major portion of their area are plugged with the fillers 10, the camelback 12, when in fluid condition, while filling the relatively small unplugged portion of the grooves 9, as shown in Fig. 5, is prevented from entering the major portion of the grooves. This is the feature which permits the matrix 13 to have plain side skirts 14 which serve only the purpose of sidewall retention, and which in the aggregate saves a large amount of new rubber.

After the top-capping operation is complete, with new traction cleats 15 and new traction grooves 16 formed on the crown 3, the tire is removed from the mold and the filler plugs 10 are stripped from the traction grooves 9, then leaving such grooves again open, as is desired to maintain the traction cleats 8 on the sidewalls 4 effective.

Figure 6:
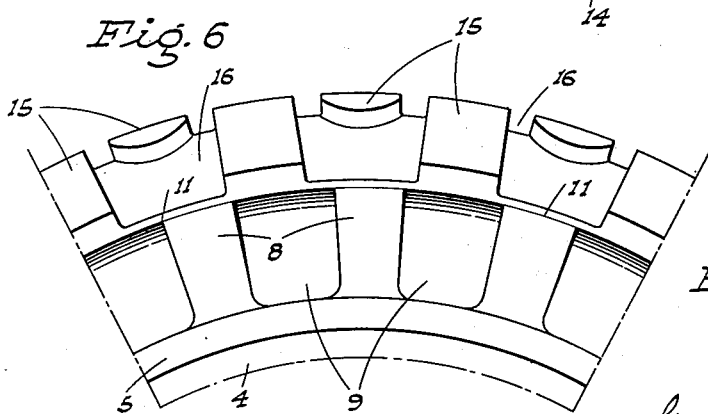
Fig. 6 is a fragmentary side elevation of the tire as top-capped.

In addition to the advantage of simplifying the matrix, and saving tread material, the present invention is also important in that it permits top-capping on heavy-duty industrial tires without regard to the positioning of the new traction cleats 15 and new traction grooves 16 relative to the original traction cleats 8 and original traction grooves 9 on the sidewalls 4. In this connection see Fig. 6, where the lack of importance of alinement is evident.

The described method provides a very practical and reliable one for the top-capping of large, heavy-duty industrial tires, and is a method which can be practiced readily and with convenience.

Also, the method is very advantageous, as it permits the application of a top-cap equal in width to the original tread.

From the foregoing description it will be readily seen that there has been produced such a method as substantially fulfills the objects of the invention as set forth herein.

While this specification sets forth the present and preferred details of the invention, still in practice such deviations from such details may be resorted to as do not form a departure from the spirit of the invention, as defined by the appended claims.

Having thus described the invention, the following is claimed as new and useful, and upon which Letters Patent are desired:

1. A method of top-capping a vehicle tire having traction cleats and intermediate traction grooves extending well down on the side walls of the tire; said method comprising the steps of preparing the crown of the tire for the reception of top-capping material, inserting removable preformed filler plugs in the sidewall traction grooves, applying camelback to the prepared crown, vulcanizing the tire in a top-capping matrix which retains the sidewalls and filler plugs, removing the tire from the matrix, and removing the filler plugs from the grooves.

2. A method of top-capping a vehicle tire having traction cleats and intermediate traction grooves extending well down on the sidewalls of the tire; said method comprising the steps of preparing the crown of the tire for the reception of top-capping material, removably cementing preformed and prevulcanized filler plugs in the sidewall traction grooves, applying camelback to the prepared crown, vulcanizing the tire in a top-capping matrix which retains the sidewalls and plugs, removing the tire from the matrix, and stripping the filler plugs from the grooves.

3. The method of top-capping a vehicle tire initially having traction cleats and intermediate traction grooves extending well down on the sidewalls of the tire; said method comprising preparing the crown of the tire for the reception of camelback, substantially filling the traction grooves with the removable material not affected by vulcanizing heat, applying camelback on the prepared crown from side to side thereof and over the outer ends of the grooves, vulcanizing said camelback onto the tire, and then removing said groove filling material.

4. In connection with a vehicle tire initially having traction cleats and intermediate traction grooves extending well down on the sidewalls, and a vulcanizing matrix arranged to enclose the sidewalls and the tread portion of the tire; the method of preparing the tire for recapping in said matrix, comprising treating the crown of the tire for the reception of camelback, substantially filling the grooves with removable material not affected by vulcanizing heat, and applying the camelback to the treated crown from side to side thereof and over the outer ends of the grooves prior to placement of the tire into the matrix for vulvanizing; the groove filling material being removed after the vulcanizing of the camelback is effected.

EDWIN A. GLYNN.

REFERENCES CITED

The following references are of record in the file of this patent:

UNITED STATES PATENTS

| Number | Name | Date |
|---|---|---|
| 1,319,575 | Druse | Oct. 21, 1919 |
| 2,297,354 | Hawkinson | Sept. 29, 1942 |
| 2,421,099 | Vogt | May 27, 1947 |
| 2,422,652 | Bacon | June 24, 1947 |
| 2,476,884 | Maynard | July 19, 1949 |
| 2,487,218 | Brinkman | Nov. 8, 1949 |
| 2,497,226 | McNeill | Feb. 14, 1950 |
| 2,612,461 | Hallgren | Sept. 30, 1952 |